United States Patent
Kawamura et al.

(10) Patent No.: US 7,644,795 B2
(45) Date of Patent: Jan. 12, 2010

(54) VEHICLE BODY STRUCTURE OF MOTORCYCLE

(75) Inventors: Hidetaka Kawamura, Akashi (JP); Tomohiro Matsuda, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 583 days.

(21) Appl. No.: 11/452,276

(22) Filed: Jun. 14, 2006

(65) Prior Publication Data

US 2006/0283650 A1    Dec. 21, 2006

(30) Foreign Application Priority Data

Jun. 17, 2005   (JP)   ............................ P2005-178131
Jun. 21, 2005   (JP)   ............................ P2005-180810
Jun. 21, 2005   (JP)   ............................ P2005-180816

(51) Int. Cl.
    *B62K 11/04*      (2006.01)
    *B62K 25/28*      (2006.01)

(52) U.S. Cl. ...................................... 180/219; 180/227
(58) Field of Classification Search ................. 180/219, 180/227, 231, 230; 280/284
See application file for complete search history.

(56) References Cited

U.S. PATENT DOCUMENTS 4,440,413 A * 4/1984 Miyakoshi et al. .......... 280/284
4,744,579 A * 5/1988 Roatta ........................ 280/275
5,762,353 A * 6/1998 Miller ........................ 280/284
6,979,014 B2 * 12/2005 Morita ...................... 280/288.1
7,438,149 B2 * 10/2008 Ishida et al. ................ 180/227
2006/0113134 A1 * 6/2006 Czysz ........................ 180/227

FOREIGN PATENT DOCUMENTS

| JP | 63-12493 | 1/1988 |
| JP | 9-076978 | 3/1997 |
| JP | 9-150773 | 6/1997 |
| JP | 2001-106155 | 4/2001 |
| JP | 2003-081170 | 3/2003 |

* cited by examiner

*Primary Examiner*—Anne Marie M. Boehler
(74) *Attorney, Agent, or Firm*—Wenderoth, Lind and Ponack, L.L.P.

(57) ABSTRACT

Disclosed is a vehicle body structure of a motorcycle which intends to make maintenance of a rear suspension easy and arranges the rear suspension in a compact manner. The vehicle body structure includes a vehicle body frame, a swing arm, and a rear suspension interposed between the vehicle body frame and the swing arm. The vehicle body frame includes a front frame body having right and left main frame members, and a rear frame body having right and left rear frame members extending to a rear side from rear end portions of the main frame members. The rear suspension is arranged so as to be eccentric to a right direction of the vehicle body from a center of the vehicle width. The rear frame body has a layout space for the rear suspension in a lower side of the right rear frame member.

9 Claims, 12 Drawing Sheets

VEHICLE BODY STRUCTURE OF MOTORCYCLE

BACKGROUND OF THE INVENTION

1. Field of the Invention

The present invention relates to a vehicle body structure of a motorcycle which is provided with a vehicle body frame and a swing arm for a rear wheel, and a rear suspension interposed between both the vehicle body frame and the swing arm.

2. Description of the Related Art

In a motorcycle having a rear suspension for a rear wheel, in general, the rear suspension is arranged in a center of a vehicle width, and a front end portion of the rear suspension is coupled to a cross member of a vehicle body frame of the motorcycle. A load applied from a swing arm for supporting the rear wheel is transmitted to the vehicle body frame via the cross member.

As another arrangement example of the rear suspension, there is a motorcycle in which the rear suspension is arranged in a side of an engine arranged within the vehicle body frame, and the rear suspension is interposed between the front end portion of the vehicle body frame and the swing arm (refer, for example, to Japanese Unexamined Patent Publication No. 2001-106155).

As in the prior art, if the rear suspension is arranged near the center of the vehicle width, various parts arranged around the rear suspension form obstacles to performing maintenance of the rear suspension, therefore, it is difficult to perform a repair, cleaning or the like. Further, the rear suspension can not be utilized as a mechanical (functional) appearance element since the rear suspension is under an approximately hindered state from an external side of the vehicle body frame.

Further, if the front end portion of the rear suspension is coupled to the cross member of the vehicle body frame, the load applied from the swing arm is first transmitted to the cross member, and is then transmitted to a main frame member or the like of the vehicle body frame. However, since the cross member is a member arranged in a vehicle width direction, the cross member receives a bending load. Further, since the rear suspension is generally attached via a support bracket protruding from the cross member, the cross member receives a torsional moment. Accordingly, high rigidity is required in the cross member. As a result, an increase of weight of the cross member is caused, and an increase of weight of the vehicle body frame is caused by extension.

Therefore, there is a consideration to arrange the rear suspension so as to be displaced right or left from the center of the vehicle width. However, in this case, since a laterally biased load is applied to the swing arm coupling a rear end portion of the rear suspension, it is necessary to increase rigidity of the swing arm in comparison with the conventional one.

If the rigidity of the entirety of the swing arm is simply increased while keeping the aspect of the conventional swing arm as it is, the weight is widely increased. Further, since various parts such as a brake disc, a caliper, a drive chain and the like are arranged around the swing arm, it may be impossible to simply make pipes constituting the swing arm thick or large.

Further, in a structure in which the rear suspension is arranged in the side of the engine within the vehicle body frame such as the technique described in Japanese Unexamined Patent Publication No. 2001-106165 mentioned above, since the rear suspension protrudes from the side of the engine in a lateral direction, it is hard to obtain a compact structure, and there is a possibility that the rear suspension will form an obstacle to the legs of a rider and a fellow passenger. Further, since the rear suspension is arranged near the engine, oil or the like within the rear suspension is easily affected by a heat of the engine.

SUMMARY OF THE INVENTION

Therefore, an object of the present invention is to provide a vehicle body structure of a motorcycle which makes maintenance of a rear suspension of the motorcycle easy, to arrange the rear suspension in a compact manner, and to save weight of a vehicle body frame of the motorcycle.

In accomplishing this and other objects of the present invention, there is provided a vehicle body structure of a motorcycle comprising: a vehicle body frame; a swing arm for a rear wheel supported to the vehicle body frame so as to freely swing in a vertical direction; and a rear suspension interposed between the vehicle body frame and the swing arm for the rear wheel, wherein the vehicle body frame is provided with a front frame body constituting a front side of the vehicle body frame, and having a head pipe, and a pair of right and left main frame members extending to a rear side from the head pipe, and a rear frame body constituting a rear side of the vehicle body frame, and having a pair of right and left rear frame members extending to a rear side from rear end portions of the main frame members, the rear suspension is arranged so as to be eccentric to any one of right and left directions of the vehicle body from a center of the vehicle width, and extends to a rear side from a portion near a rear end of the main frame member so as to be coupled to the swing arm, and the rear frame body has a layout space for the rear suspension in a lower side of any one of the right and left rear frame members.

In accordance with the structure mentioned above, since the layout space for arranging the rear suspension is formed in the lower side of the rear frame member, it is possible to arrange the rear suspension in a compact manner in the space without largely protruding from the vehicle body, and it is possible to easily execute the maintenance of the rear suspension.

Preferably, the rear frame body may have a pair of right and left rear assist frame members arranged in the lower side of the rear frame member, extending to the front side from a rear portion of the rear frame member, and having a front end portion coupled to the front frame body, one of the right and left rear assist frame members may have a displacement portion arranged closer to the center of the vehicle width than the other of the right and left rear assist frame members, and the layout space for the rear suspension may be formed in an outer side in a lateral direction of the displacement portion.

In accordance with the structure mentioned above, it is possible to properly form the layout space of the rear suspension in the outer side in the lateral direction of the displacement portion formed in one of the right and left rear assist frame members.

Preferably, the displacement portion of one of the right and left rear assist frame members, and the rear frame member in the same side may be coupled to each other by a connection frame member extending in a vertical direction.

In accordance with this structure, it is possible to reinforce the displacement portion of the rear assist frame member and the rear frame member in the same side with each other by the connection frame member without invading the layout space for the rear suspension, and it is possible to increase rigidity of the rear frame body.

Preferably, the rear suspension may be arranged at a position overlapping one of the right and left rear frame members as seen from above.

In accordance with this structure, it is possible to accommodate at least a part of the rear suspension within the vehicle body frame in a compact manner, and the rear suspension hardly forms an obstacle to the legs of the rider and the fellow passenger.

Preferably, the rear suspension may be arranged approximately on the same straight line as one of the right and left main frame member from the rear end portion of the main frame member to a rear side.

In accordance with this structure, since it is possible to directly transmit the load from the swing arm to the main frame member, and the main frame member can receive most of the transmitted load as an axial load, it is possible to increase a withstand load performance of the main frame member against the load from the swing arm, and it is possible to intend to save weight of the main frame member.

Preferably, the vehicle body frame may be have a cross member for coupling between rear end portions of the right and left main frame members, the cross member may have a front support boss for supporting an end portion of the rear suspension so as to freely swing in a coupled portion to the main frame member, and a swing supporting point of the rear suspension in the front support boss is arranged approximately on the same axis as the cross member.

In accordance with this structure, since the swing supporting point of the rear suspension is arranged on the same axis as the cross member, it is possible to reduce the burden to the cross member on the basis of the load applied to the cross member from the swing arm via the rear suspension without generating the torsional moment in the cross member. Accordingly, it is possible to save weight of the cross member, the vehicle body frame by extension. Further, since the swing supporting point of the rear suspension does not protrude to the front, the rear, the upper and the lower with respect to the cross member, an appearance from the side is improved. Further, since the front support boss is provided in the coupled portion to the main frame member, it is possible to directly transmit the load from the swing arm via the rear suspension to the main frame member.

Preferably, the rear suspension may be arranged approximately on the same straight line as the main frame member as seen from the side.

In accordance with this structure, the main frame member can receive most of the load transmitted from the swing arm via the rear suspension as the axial load, it is possible to improve the withstand load performance of the main frame member against the swing arm, whereby it is possible to save weight of the main frame member.

Preferably, the cross member may have a main body portion extending in the lateral direction, and the front support boss firmly attached to an end portion of the main body portion, and the front support boss may have a pair of shaft supporting portions for supporting both end portions of a swing supporting shaft of the rear suspension, and a coupling portion for coupling the shaft supporting portions to each other and connecting rear end portions of the main frame member.

In accordance with this structure, it is possible to partially increase strength of the front support boss (strength of the coupled portion) of the cross member to which the rear suspension is coupled and the main frame member is connected, and it is possible to intend to save weight of the cross member in comparison with the case that strength of the entire of the cross member is increased.

Preferably, the swing arm may have a pair of right and left arm members, a pair of right and left stabilizer members respectively provided on upper surfaces of the arm members, and a rear support boss for supporting an end portion of the rear suspension, the rear support boss being integrally connected to one of the right and left stabilizer members, and both the stabilizer members may be formed in different cross sectional shapes from each other in such a manner that rigidity of one of the right and left stabilizer members connected to the rear support boss becomes higher than rigidity of the other of the right and left stabilizer members.

In accordance with this structure, it is possible to effectively increase the rigidity of one of the right and left stabilizer members to which the rear suspension is coupled, and it is possible to arrange the rear suspension so as to be displaced in the lateral direction while suppressing an increase of weight of the entire of the swing arm.

Preferably, one of the right and left stabilizer members connected to the rear support boss may be arranged approximately on the same straight line as the rear suspension as seen from the side in such a manner as to extend to the rear side.

In accordance with this structure, the stabilizer member can receive a reaction force applied to the swing arm from the rear suspension as the axial load, and it is possible to increase the withstand load performance of the stabilizer member.

Preferably, a length in the vertical direction of the cross sectional shape of one of the right and left stabilizer members connected to the rear support boss may be formed longer than a length in the vertical direction of the cross sectional shape of the other of the right and left stabilizer members.

In accordance with this structure, it is possible to effectively increase the rigidity without enlarging a lateral width of one of the right and left stabilizer members to which the rear suspension is coupled, and no obstacle is generated in the layout of the peripheral parts arranged in the side of the swing arm.

BRIEF DESCRIPTION OF THE DRAWINGS

This and other objects and features of the present invention will become clear from the following description taken in conjunction with a preferred embodiment thereof with reference to the accompanying drawings.

DETAILED DESCRIPTION OF THE PREFERRED EMBODIMENTS

Figure 1:
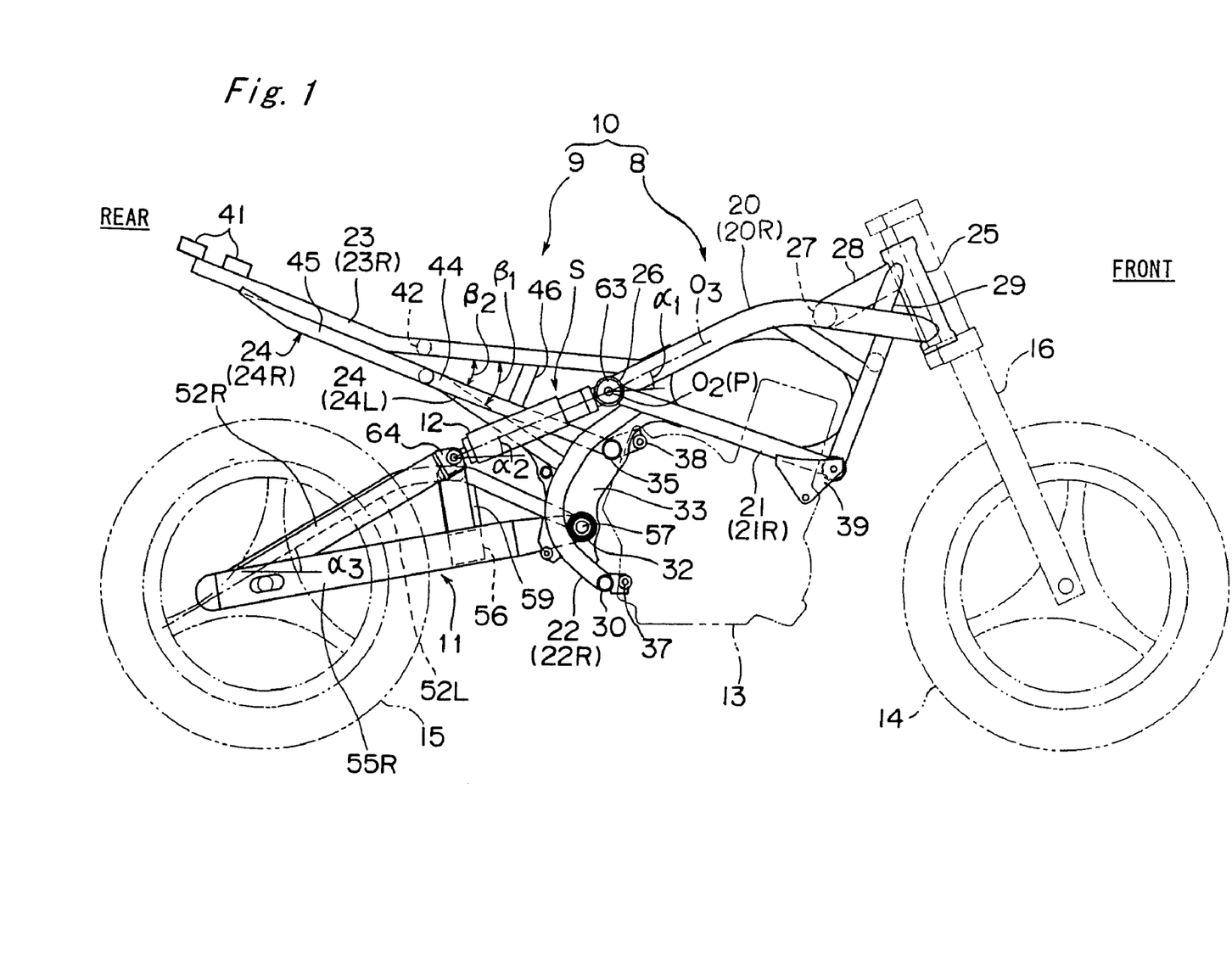
FIG. 1 is a right side elevational view of a vehicle body frame or the like of a motorcycle in accordance with an embodiment of the present invention.
Figure 2:
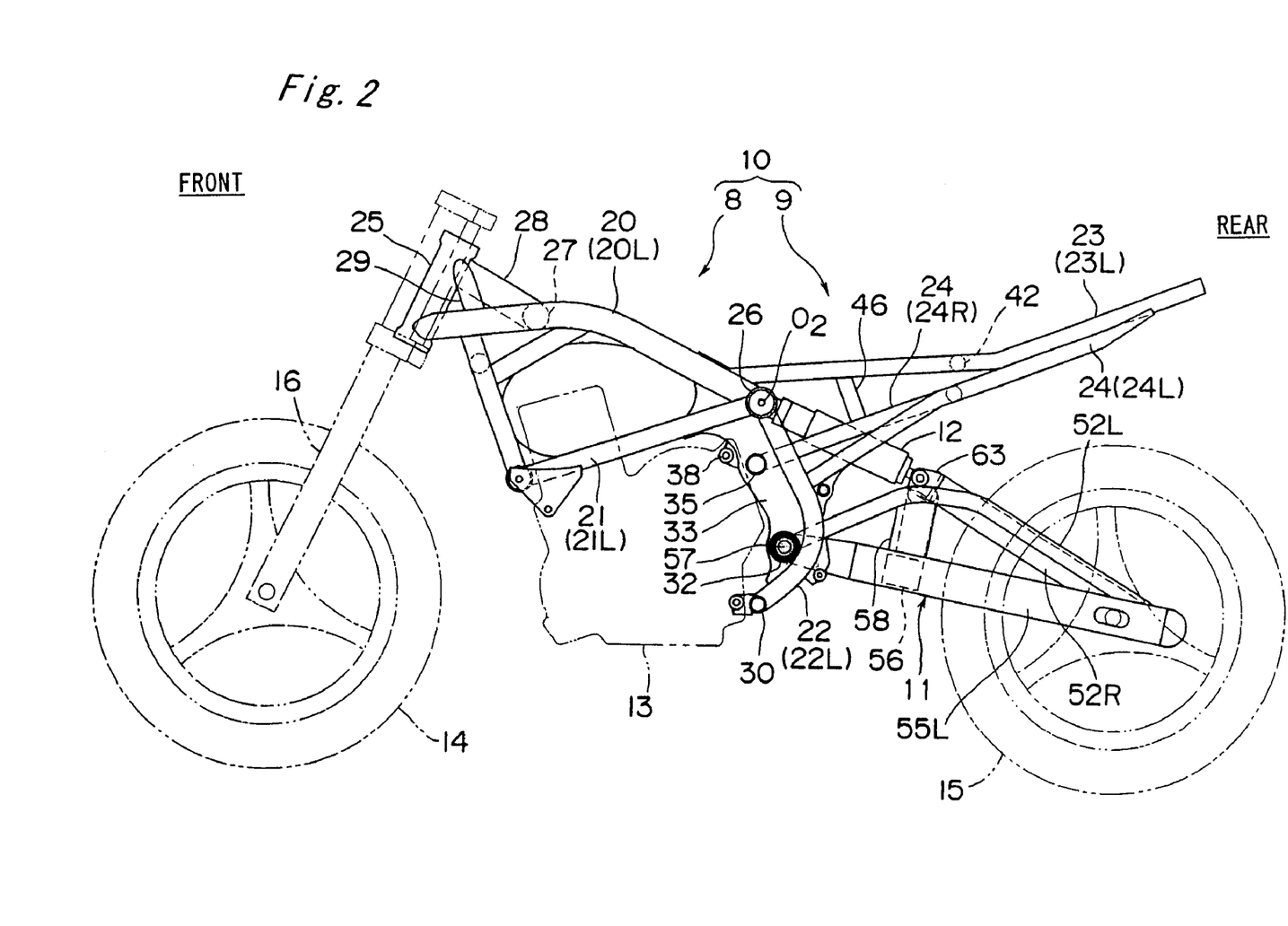
FIG. 2 is a left side elevational view of the vehicle body frame or the like of the motorcycle of FIG. 1.

FIG. 1 is a right side elevational view of a vehicle body frame or the like of a motorcycle in accordance with an embodiment of the present invention, and FIG. 2 is a left side elevational view of the vehicle body frame or the like of the motorcycle. In these drawings, the vehicle body frame 10, a swing arm 11 and a rear suspension 12 are shown by solid lines, an engine 13, front and rear wheels 14 and 15, a front fork 16 and the like are shown by virtual lines, and the other portions are omitted.

[Structure of Vehicle Body Frame]

Figure 3:
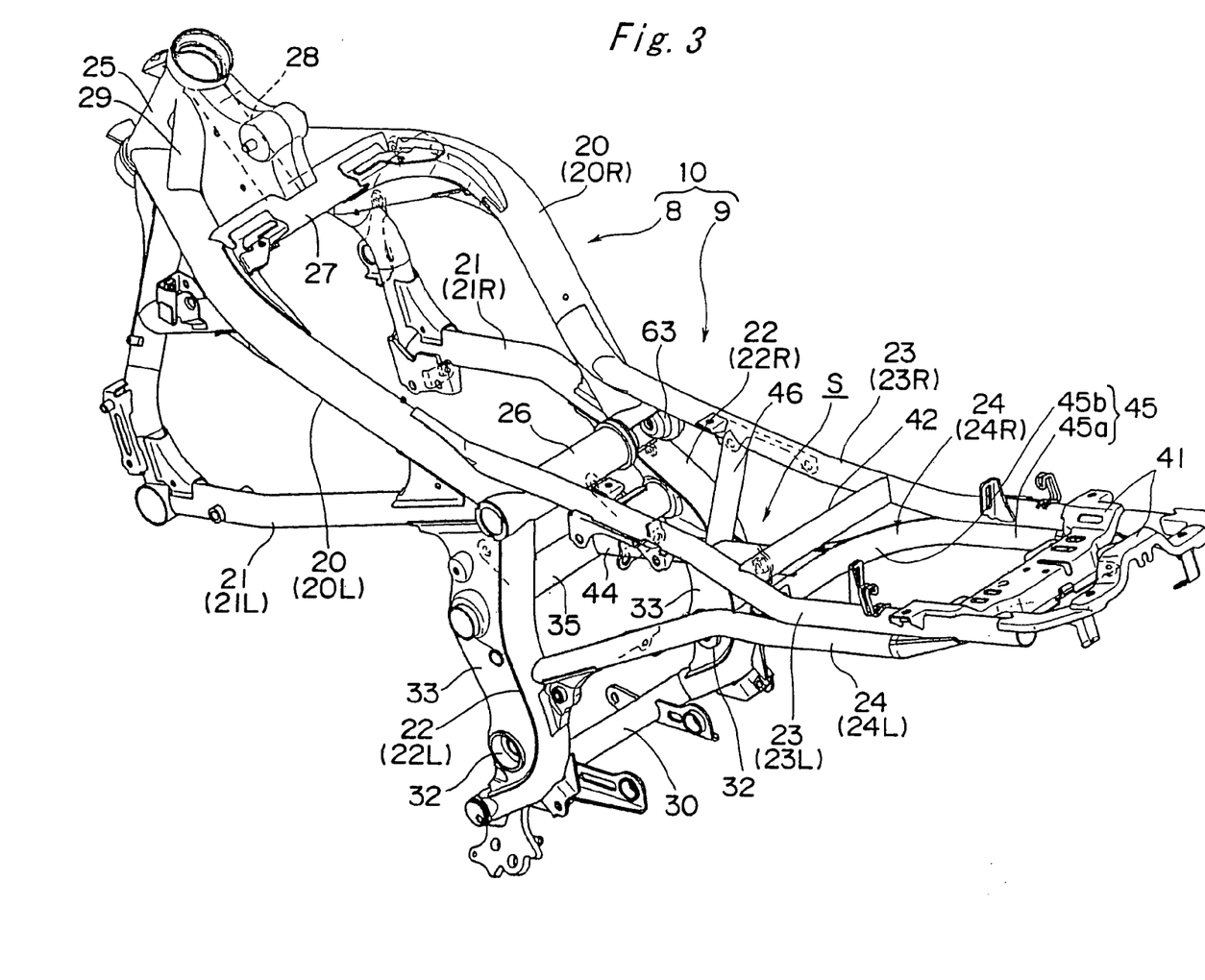
FIG. 3 is a perspective view of the vehicle body frame of FIG. 2.

FIG. 3 is a perspective view of the vehicle body frame 10. The vehicle body frame 10 is mainly constituted by a front frame body 8 arranged in a front side, and a rear frame body 9 arranged in a rear side. The front frame body 8 includes a main frame member 20 having a pair of left and right main frame members 20L and 20R, a sub frame member 21 having a pair of left and right sub frame members 21L and 21R, and a lower frame member 22 having a pair of left and right lower frame members (bracket members) 22L and 22R. The rear frame body 9 includes a rear frame member 23 having a pair of left and right rear frame members 23L and 23R, and a rear assist frame member 24 having a pair of left and right rear assist frame members 24L and 24R. The front and rear frame bodies 8 and 9 include a plurality of cross members 26, 27, 30, 35 and 42, and a plurality of connection frame members 28, 29 and 46. Each of the frame members is mainly formed by a circular or rectangular pipe member.

Front end portions of the left and right main frame members 20L and 20R are connected to a head pipe 25 for rotatably supporting a steering handle (not shown) of the motorcycle. Rear end portions of the left and right main frame members 20L and 20R are connected to each other by the center cross member 26. The left and right main frame members 20L and 20R are structured, as shown in FIGS. 1 and 2, such that a front side thereof as seen from the side is sloped in a slightly forward downward shape, and a rear side thereof is sloped in a rearward downward shape. In FIG. 1, reference symbol α1 is an angle of slope of the rear side of the right main frame member 20R with respect to a horizontal line.

Figure 4:
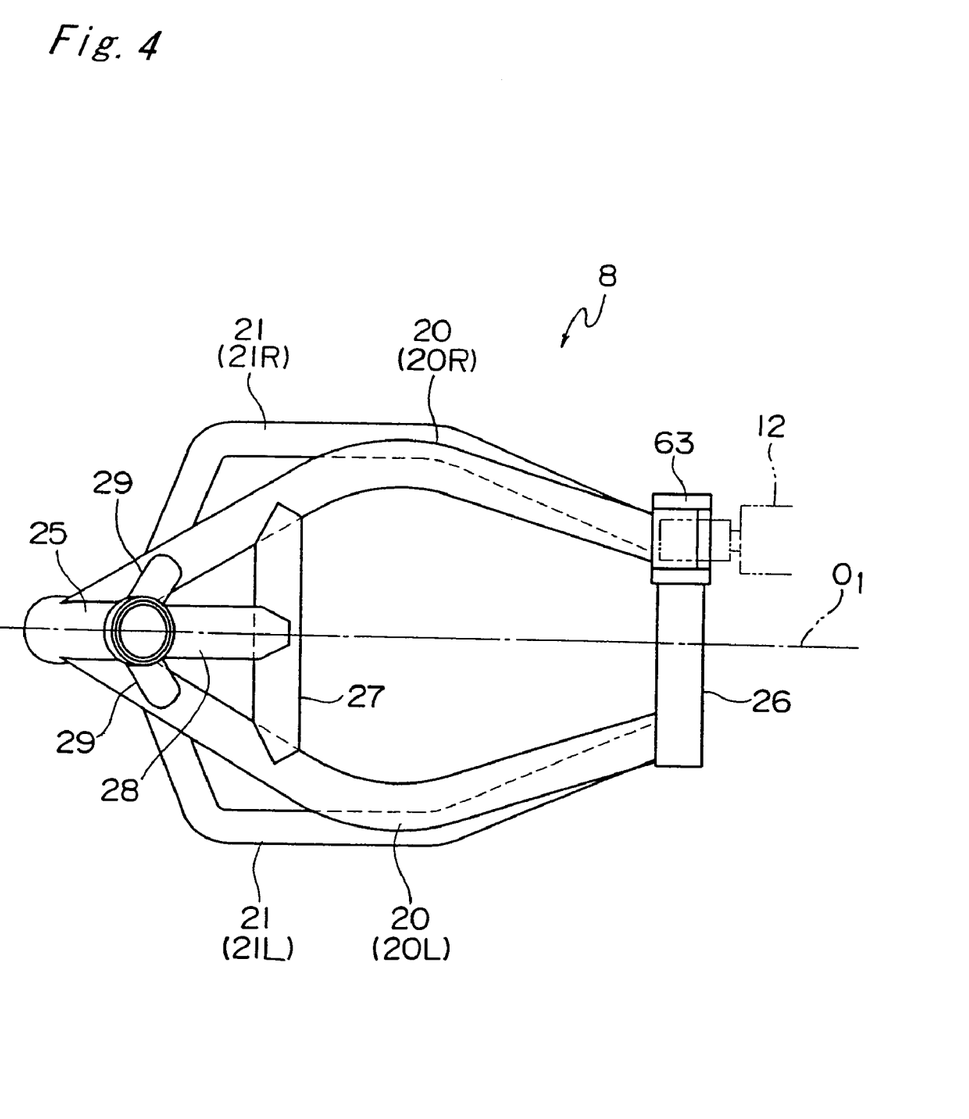
FIG. 4 is a plan view of a front side of the vehicle body frame.

FIG. 4 is a plan view of the front frame body 8. The front sides of the left and right main frame members 20L and 20R are sloped away from a center O1 of a vehicle width toward the rear, and the rear sides of the left and right main frame members 20L and 20R are sloped toward the center O1 of the vehicle width toward the rear, as seen from above. Approximately center portions in the longitudinal direction of the main frame members 20L and 20R protrude most to an outer side in a lateral direction (a vehicle width direction). Front portions of the left and right main frame members 20L and 20R are coupled to each other by the front cross member 27 extending in the lateral direction. The front cross member 27 is structured such that a lateral center portion thereof is coupled to the head pipe 25 via the connection frame member 28. Further, each of the left and right main frame members 20L and 20R is coupled to the head pipe 25 by the connection frame member 29 extending diagonally, in a front side of the front cross member 27.

As shown in FIG. 3, the left and right sub frame members 21L and 21R are respectively arranged in lower sides of the left and right main frame members 20L and 20R, and are formed in an L shape in a side elevational view. Each of the sub frame members 21L and 21R extends to the lower side from the front lower surfaces of the main frame members 20L and 20R, and is bent to the rear side at a bottom end, and a rear end portion thereof is connected to the center cross member 26.

The lower frame members 22L and 22R are arranged in a lower side of the center cross member 26. The lower frame members 22L and 22R are formed in a C shape or an L shape in a side elevational view, and upper ends and lower ends of the lower frame members 22L and 22R are forward directed. The upper end of the left lower frame member 22L is connected to a lower surface of the center cross member 26 (FIG. 2). The upper end of the right lower frame member 22R is connected to a lower surface of a rear end portion of the right sub frame member 21R (FIG. 1). Lower end portions of the left and right lower frame members 22L and 22R are coupled to each other by the lower cross member 30. Front sides of the right and left lower frames 22L and 22R are provided with support brackets 33 having boss portions 32 for supporting the front end of the swing arm 11. The left and right support brackets 33 and 33 are coupled to each other by the assist cross member 35 extending in the lateral direction and arranged between the center cross member 26 and the boss portion 32 in the vertical direction.

As shown in FIG. 1, engine mounting brackets 37, 38 and 39 are provided in the lower cross member 30, the assist cross member 35 and the lower end of the sub frame member 21. The engine 13 is supported to the vehicle body frame 10 via the mounting brackets 37, 38 and 39.

As shown in FIG. 3, the left and right rear frame members 23L and 23R have a function serving as a seat rail supporting a seat (not shown) for a rider of the motorcycle. The left and right rear frame members 23L and 23R extend to the rear side from the main frame members 20L and 20R. Front ends of the left and right rear frame members 23L and 23R are respectively connected to rear portions of the left and right main frame members 20L and 20R. Rear end portions of the left and right rear frame members 23L and 23R are coupled to each other by a coupling bracket 41. Longitudinal midway portions of the left and right rear frame members 23L and 23R are coupled to each other by the rear cross member 42.

The left and right rear assist frame members 24L and 24R are respectively arranged in lower sides of the left and right rear frame members 23L and 23R. As shown in FIG. 2, the left rear assist frame member 24L is sloped down to the front. A rear end portion of the left rear assist frame member 24L is coupled to the rear portion of the left rear frame member 23L. A front end portion of the left rear assist frame member 24L is connected to a vertical midway portion of the left lower frame member 22L. On the other hand, the right rear assist frame member 24R is sloped down to the front, as shown in FIG. 1. A rear end portion of the right rear assist frame member 24R is coupled to the rear portion of the right rear frame member 23R. A front end portion of the right rear assist frame member 24R is connected to the assist cross member 35.

Figure 5:
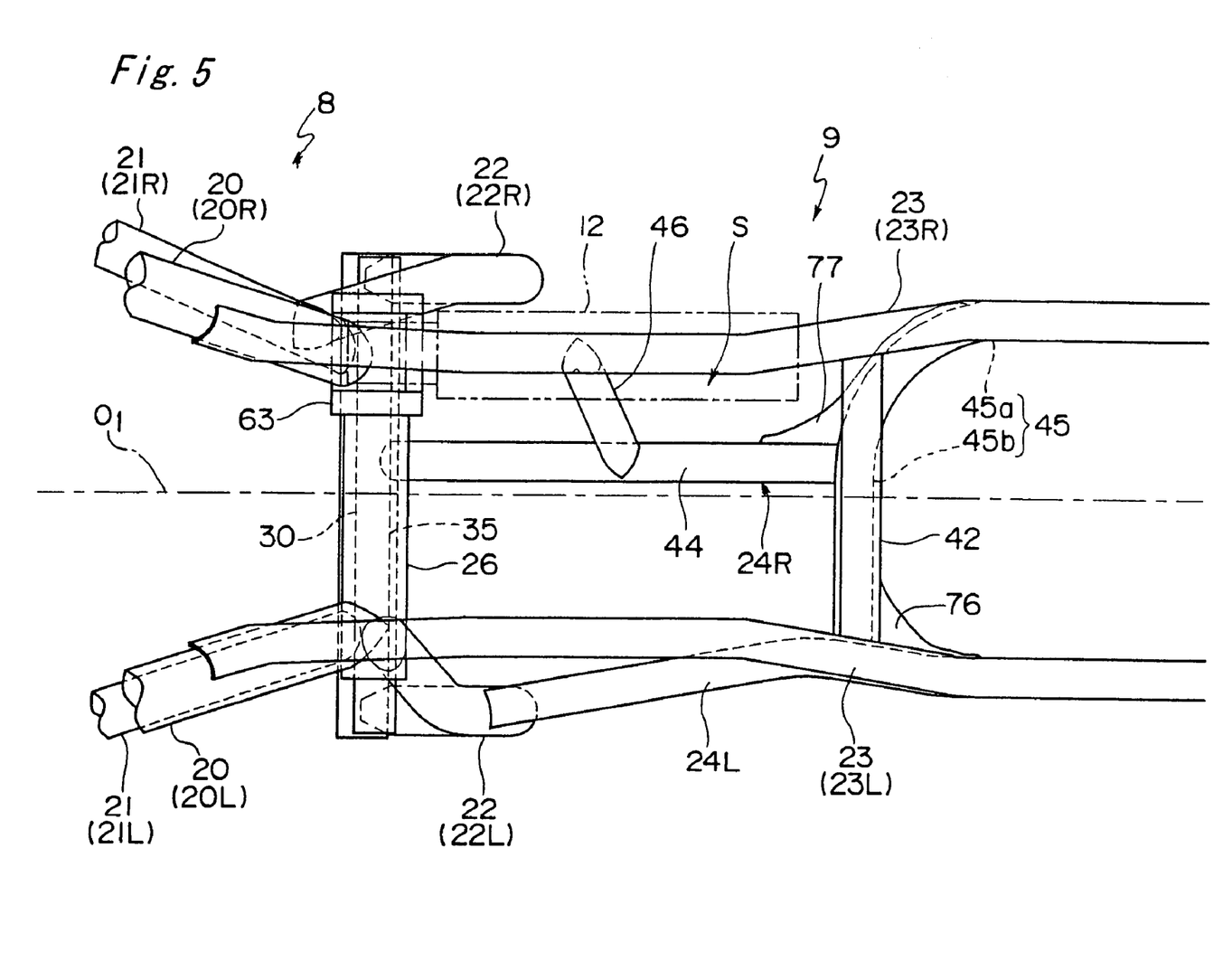
FIG. 5 is a plan view of a center portion in a longitudinal direction of the vehicle body frame.

FIG. 5 is a plan view of the center portion in the longitudinal direction of the vehicle body frame 10. The right rear assist frame member 24R is constituted by a front member 44 and a rear member 45. The rear member 45 is formed in an approximately L shape in a plan view by a longitudinal portion 45a extending in the longitudinal direction and a lateral portion 45b extending in a leftward direction from a front end of the longitudinal portion 45a. A rear end portion of the longitudinal portion 45a is connected to the rear portion of the right rear frame member 23R. The lateral portion 45b is arranged near the center in the longitudinal direction of the rear frame member 23 (in a lower side of the rear cross member 42), and is structured such that a left end is connected to the left rear assist frame member 24L. The front member 44 extends in the longitudinal direction, and is structured such that a rear end portion is connected to the lateral portion 45b of the rear member 45, and a front end is connected to the assist cross member 35. Further, the front member 44 and the right rear frame member 23R are coupled by the connection frame member 46 extending in a vertical direction and a lateral direction. The connection frame member 46 is formed approximately perpendicular to the front member 44 as seen from the side. A reinforcing gusset (rib) 76 is provided in a connection portion between the lateral portion 45b of the rear member 45 and the left rear assist frame member 24L, and a reinforcing gusset (rib) 77 is provided in a connection portion between the lateral portion 45b and the front member 44.

Accordingly, the left and right rear assist frame members 24L and 24R are formed in a mutually asymmetrical shape, the right rear assist frame member 24R has the front member (the displacement portion) 44 arranged so as to be displaced closer to the center O1 of the vehicle width than the left rear assist frame member 24L, and a space S is formed in an outer side in the lateral direction of the displacement portion 44 below the right rear frame member 23R. The rear suspension 12 is arranged in the space S.

[Structure of Swing Arm]

Figure 6:
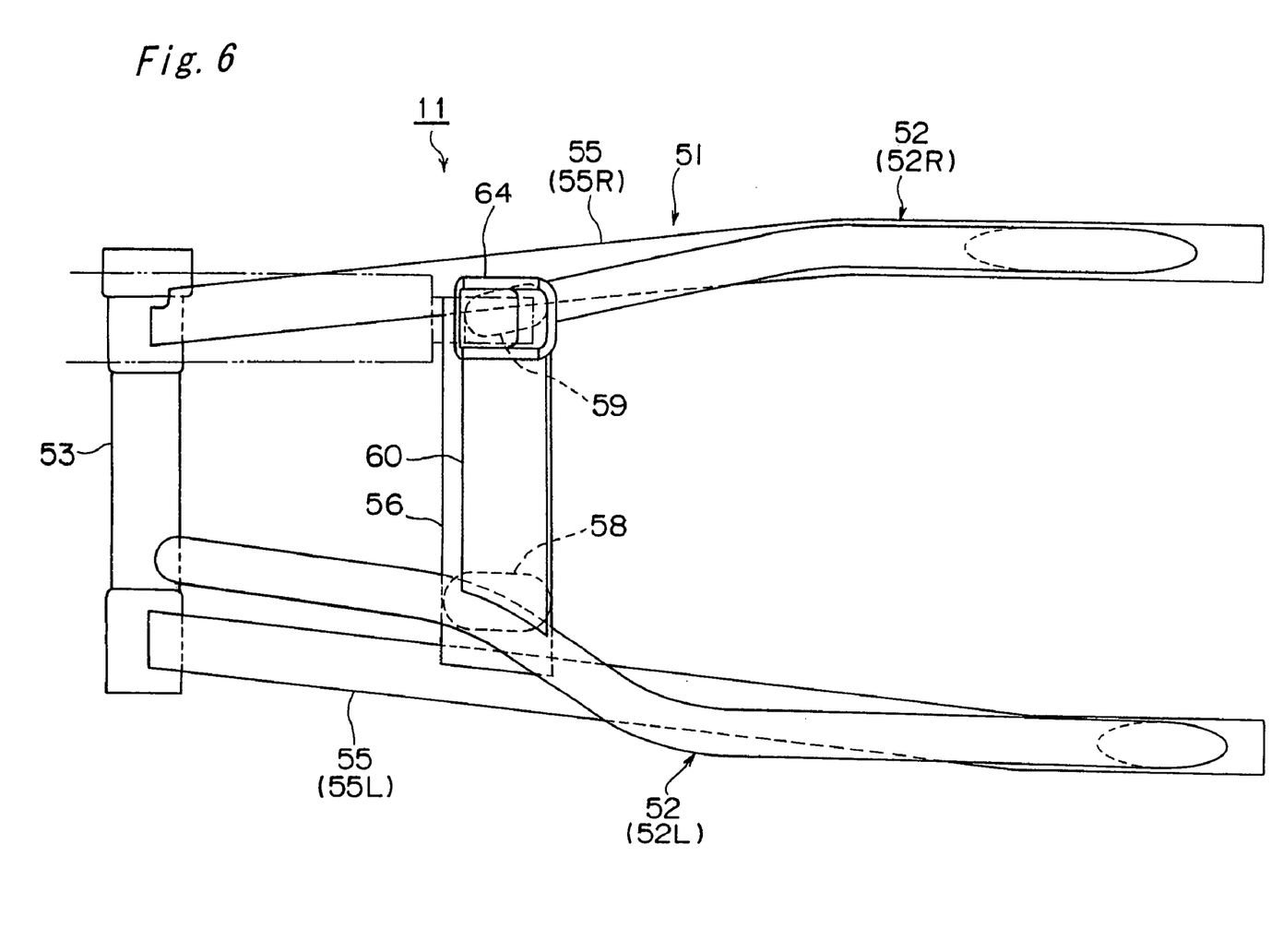
FIG. 6 is a plan view of a swing arm of the motorcycle of FIG. 1.

FIG. 6 is a plan view of the swing arm 11. The swing arm 11 is constituted by an arm main body 51, a stabilizer member 52 having left and right stabilizer members 52L and 52R provided in an upper surface of the arm main body 51, a pivot tube 53 provided in a front end portion of the arm main body 51 and the like.

The arm main body 51 includes an arm member having a pair of left and right arm members 55L and 55R extending in the longitudinal direction, and a cross member 56 coupling longitudinal midway portions of the left and right arm members 55L and 55R to each other. Both the arm members 55L and 55R are arranged at an interval in the vehicle width direction, and are structured so as to support a rear axle (not shown) in rear end portions of both the arm members 55L and 55R.

The left and right stabilizer members 52L and 52R are provided in a state of being approximately along the left and right arm members 55L and 55R as seen from above. The left stabilizer member 52L is structured, as shown in FIG. 2, such that a rear end is connected to a rear upper surface of the left arm member 55L, a front end is connected to the pivot tube 53 (FIG. 6), and a longitudinal midway portion is bent upward in a chevron shape. The bent portion of the left stabilizer member 52L is coupled to the cross member 56 via a support member 58 extending vertically.

The right stabilizer member 52R is structured, as shown in FIG. 1, such that a rear end is connected to a rear upper surface of the right arm member 55R and extends diagonally to a front upper side. A front end portion of the right stabilizer member is coupled to the cross member 56 via a support member 59 extending vertically. Further, as shown in FIG. 6, the right support member 59 and the left support member 58 are coupled to each other by a reinforcing member 60 extending in the lateral direction.

Figure 7:
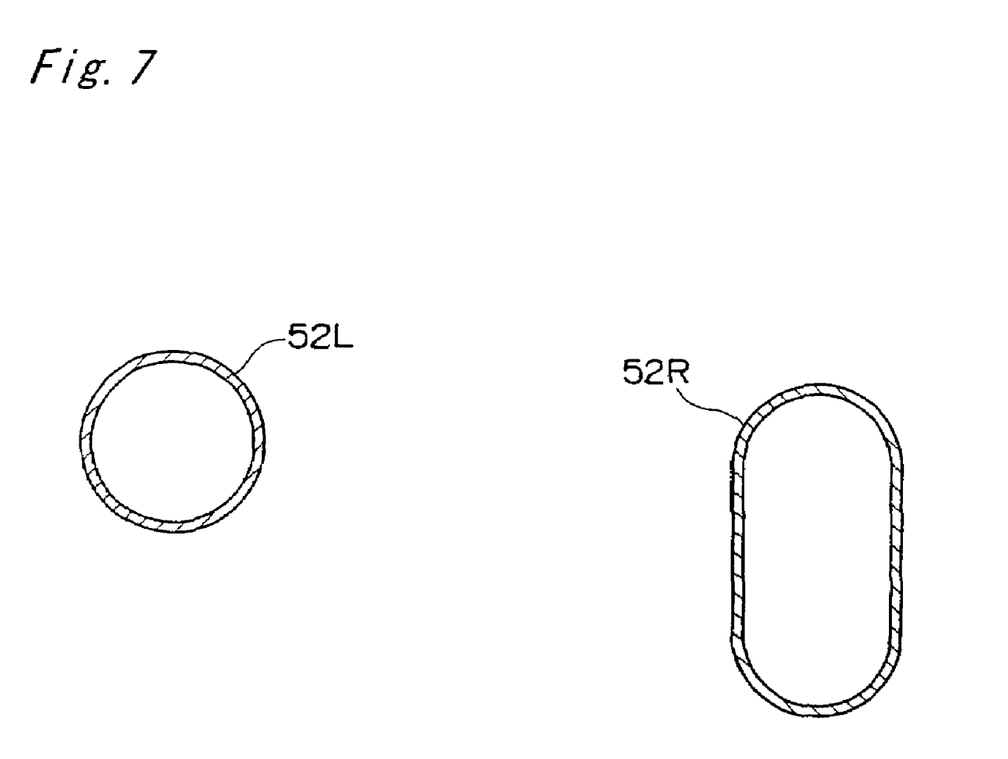
FIG. 7 is a cross sectional view showing shapes of right and left stabilizer members of the swing arm of FIG. 6.

FIG. 7 shows cross sectional shapes of the left and right stabilizer members 52L and 52R. The left stabilizer member 52L is formed by a pipe member having a circular (a complete round) cross sectional shape, however, the right stabilizer member 52R is formed by a pipe member having a vertically long oval cross sectional shape. Lateral widths of the left and right stabilizer members 62L and 52R are approximately identical, or the lateral width of the light stabilizer member 52R is formed slightly smaller than that of the left stabilizer member 52L. A vertical length of the cross sectional shape of the right stabilizer member 52R is formed longer than that of the left stabilizer member 52L. Thicknesses of the pipe members of both the stabilizer members 52L and 52R are approximately identical. Accordingly, strength (rigidity) of the right stabilizer member 52R is higher than that of the left stabilizer member 52L, and particularly, bending strength (bending rigidity) in the vertical direction is higher.

Figure 8:
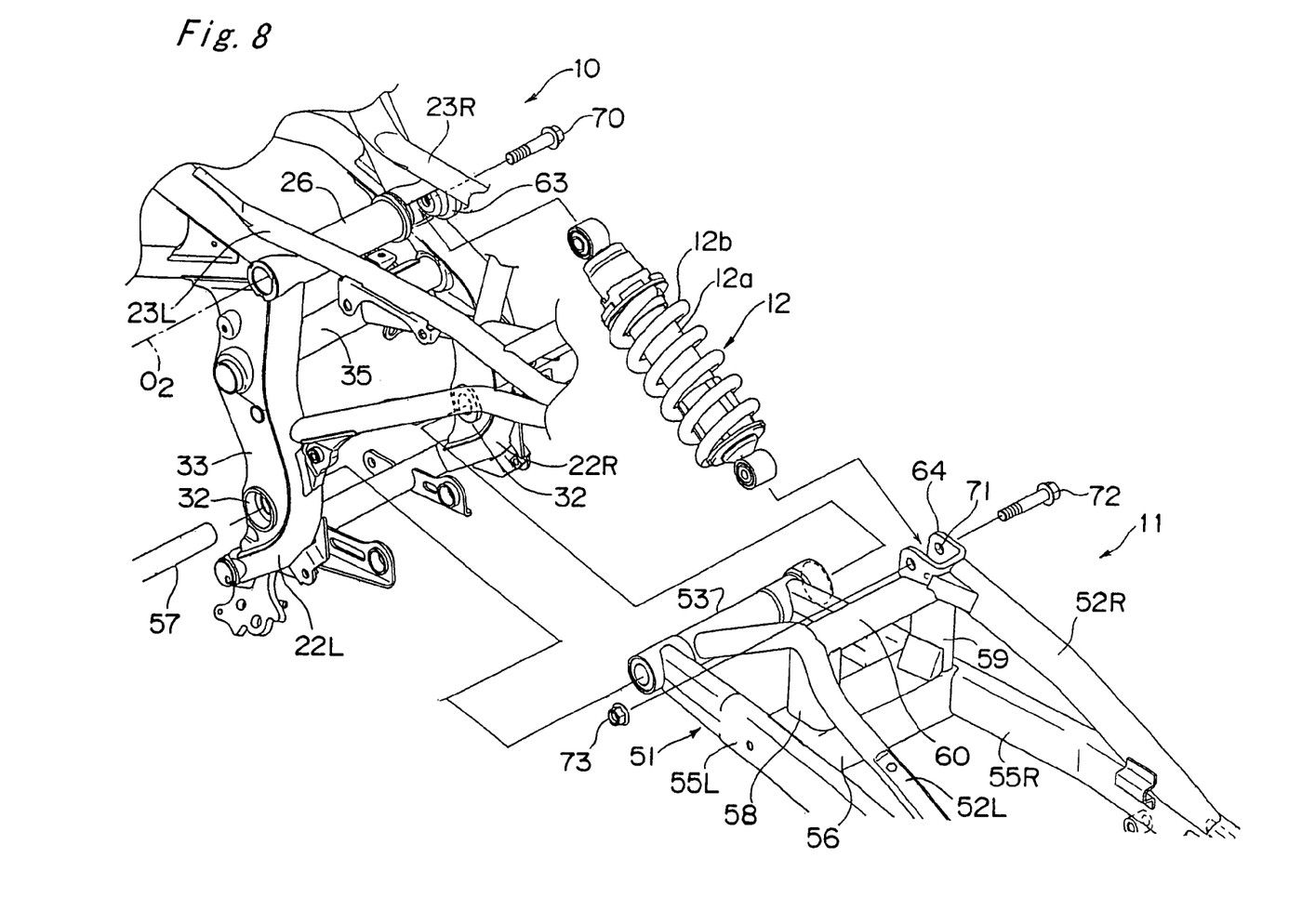
FIG. 8 is an exploded perspective view showing a coupled portion between the vehicle body frame and the swing arm.

FIG. 8 is an exploded perspective view showing a coupled portion between the vehicle body frame 10 and the swing arm 11. The swing arm 11 is supported to the lower frame members 22L and 22R so as to freely swing in the vertical direction, by inserting the pivot tube 53 between the boss portions 32 of the left and right support brackets 33 and inserting the pivot shaft 57 from the side to the boss portions 32 and the pivot tube 53.

[Rear Suspension and Mounting Structure Thereof]

The rear suspension 12 corresponds to a shock absorber, for example, obtained by combining a hydraulic shock absorber 12a and a shock absorbing coil spring 12b, and is expandable in a longitudinal direction. As shown in FIG. 1, the center cross member 26 is provided with a front support boss 63 for attaching the front end portion of the rear suspension, and a front end portion of the right stabilizer member 52R is provided with a rear support boss 64 for attaching the rear end portion of the rear suspension 12.

Figure 9:
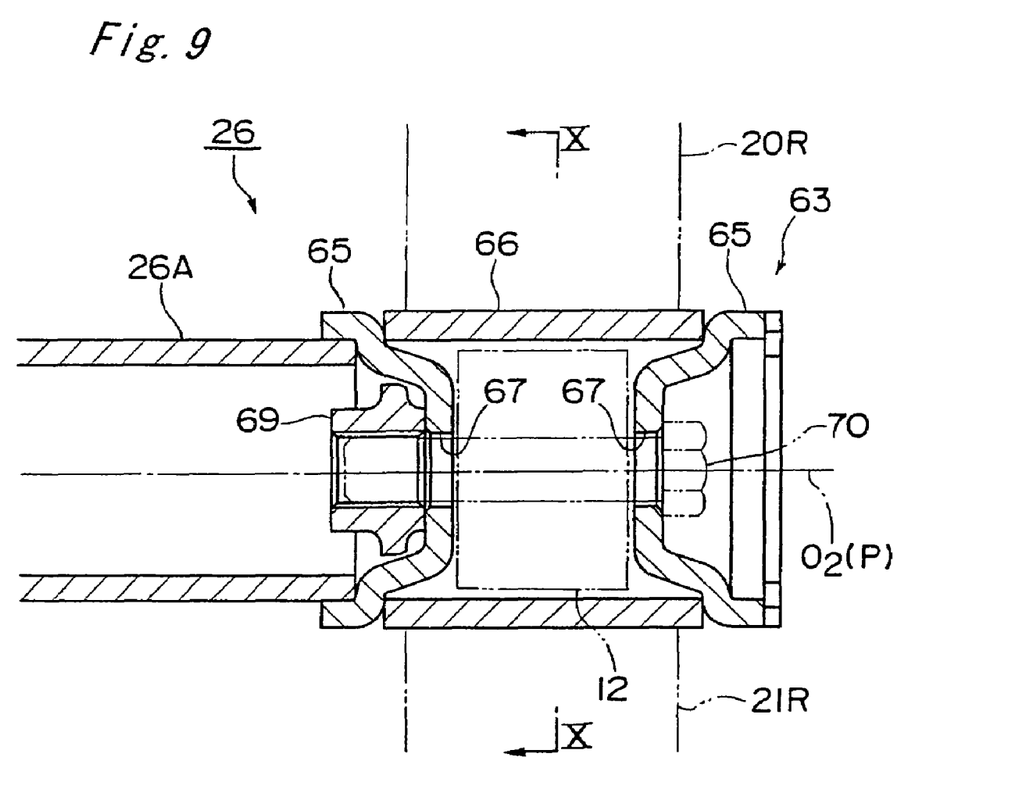
FIG. 9 is a cross sectional view showing a front support boss portion of a rear suspension of the motorcycle of FIG. 1.
Figure 10:
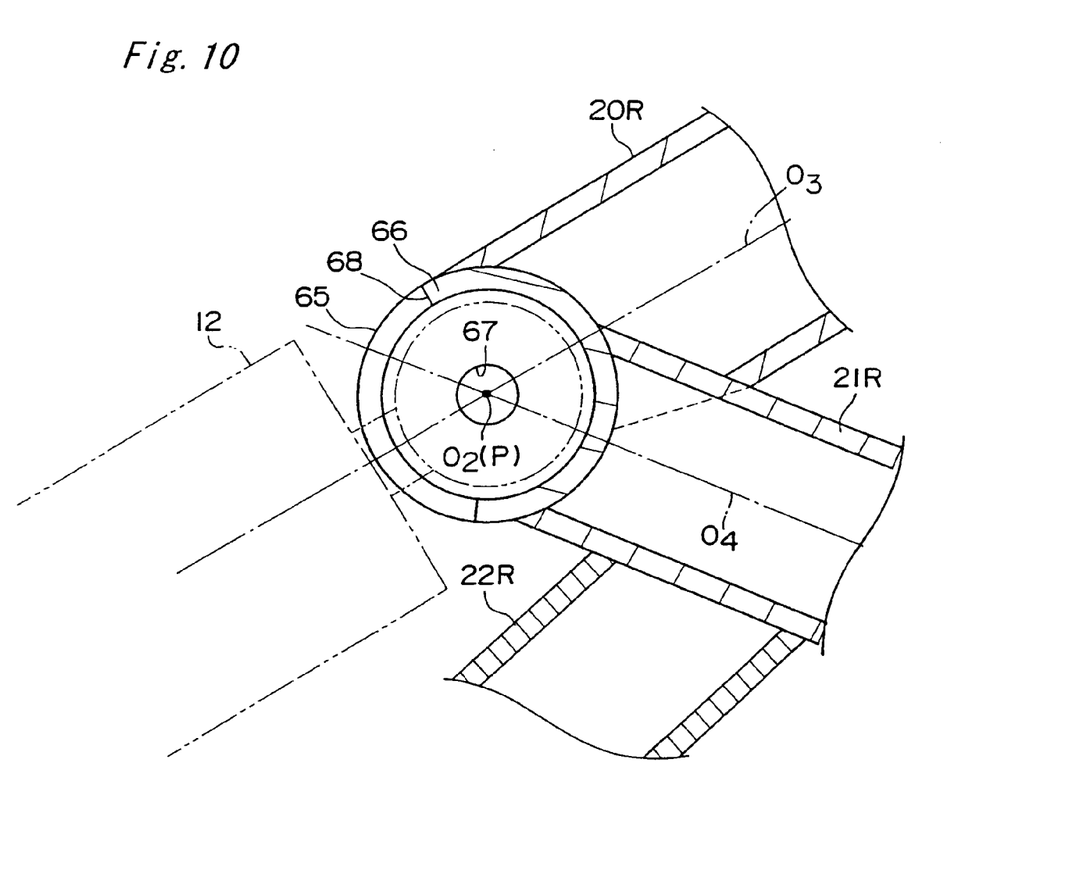
FIG. 10 is a cross sectional view along line X-X in FIG. 9.

FIG. 9 is a front elevational cross sectional view of the front support boss 63, and FIG. 10 is a cross sectional view along line X-X in FIG. 9. The center cross member 26 of the front frame body 8 is provided with a tube body (a main body portion) 26A extending in the lateral direction, and the front support boss 63 firmly attached to a right end of the tube body 26A by welding or the like. The front support boss 63 is provided with a pair of left and right shaft support plates (shaft support portions) 65 and 65, and a coupling plate (a coupling receiving portion) 66 coupling both the shaft support plates 65 and 65 in an outer peripheral portion. The shaft support plates 65 and the coupling plate 66 are firmly attached to each other by welding or the like.

The shaft support plate 65 is formed in a dish shape, and is structured such that a shaft through hole 67 is formed in a center thereof, and a nut member 69 is firmly attached to a side surface of the shaft support plate 65 in the tube body 26A side coaxially with the shaft through hole 67.

The coupling plate 66 is formed in a C shape in a side elevational view, and has an opening 68 in which can be inserted the front end portion of the rear suspension 12, between the support plates 65 and 65. The coupling plate 66 is provided in a range over a half or more of the outer periphery of the shaft support plate 65, so as to form the opening 68 approximately in such a minimum dimension as to allow the front end portion of the rear suspension 12 to be freely inserted. A rear end portion of the right main frame member 20R and a rear end portion of the right sub frame 21R abut against the coupling plate 66 and are firmly attached thereto by welding.

As shown in FIGS. 8 and 9, the front end portion of the rear suspension 12 is inserted into the front support boss 63 from the opening 68, and is attached to the front support boss 63 so as to freely swing, by inserting a shaft bolt 70 to the shaft through hole 67 from the lateral outer side of the front support boss 63 and engaging the shaft bolt 70 with the nut member 69. A front end swing support point P of the rear suspension 12 is arranged on an axis O2 of the center cross member 26, and is arranged at a position intersecting center axes O3 and O4 of the right main frame member 20R and the right sub frame member 21R as seen from the side, as shown in FIG. 10.

As shown in FIGS. 6 and 8, the rear support boss 64 is constituted by a plate member provided in a front end of the right stabilizer member 52R and having a C shape in a plan view. A shaft through hole 71 is formed in both left and right side portions of the rear support boss 64. The rear end portion of the rear suspension 12 is inserted into the C-shaped portion of the rear support boss 64, and is attached to the rear support boss 64 so as to freely swing, by inserting a shaft bolt 72 to the shaft through hole 71 and engaging a shaft bolt 72 with a nut 73.

The rear suspension 12 attached in the manner mentioned above is displaced from the center O1 of the vehicle width to the right side so as to be arranged in parallel to the center O1 of the vehicle width as shown in FIG. 5, and an amount of displacement thereof coincides with an amount of displacement of the rear end portion of the right main frame member 20R. The rear suspension 12 is arranged in a rear downward slope shape as seen from the side, as shown in FIG. 1, and an angle α2 of slope with respect to the horizontal line approximately coincides with the angle α1 of slope of the main frame member. Accordingly, the right main frame member 20R and the rear suspension 12 are arranged approximately on the same straight line as seen from the side surface.

Further, the rear suspension 12 is arranged in the space S formed in the lateral outer side of the displacement portion 44 of the right rear assist frame member 24R, as shown in FIG. 5, and is arranged so as to overlap the lower side of the right rear frame member 23R as seen from above. Further, the rear suspension 12 is arranged so as to intersect the displacement portion 44 of the right rear assist frame member 24R as seen from the side, as shown in FIG. 1.

In FIG. 1, the right stabilizer member 52R of the swing arm 11 is arranged in a rear downward slope shape as seen from the side, and an angle α3 of slope with respect to the horizontal line approximately coincides with the angles α1 and α2 of slope or is similar thereto. Further, since the rear end of the rear suspension 12 is attached to the front end portion of the right stabilizer member 52R, the rear suspension 12 and the right stabilizer member 52R are arranged approximately on the same straight line as seen from the side and above.

Operation and Effect of Present Embodiment (1) As shown in FIG. 1, if the swing arm 11 relatively swings up and down with respect to the vehicle body frame 10 during travel, the load during ascending is transmitted to the rear suspension 12 from the right stabilizer member 52R, and is attenuated by the rear suspension 12 so as to be transmitted to the right main frame member 20R. At this time, since the rear suspension 12 is coupled to the rear end portion of the right main frame member 20R continuously, and the rear suspension 12 and the right main frame member 20R are arranged on the same straight line as seen from the side, the vehicle body frame 10 can receive the load applied from the rear suspension 12 as the axial load of the right main frame member 20R, and the lateral load is hardly applied. Accordingly, it is possible to receive the load from the swing arm 11 without intending to increase the thickness and the pipe diameter of the vehicle body frame 10.

(2) As shown in FIG. 10, since the swing support point P in the front end of the rear suspension 12 is arranged on the axis O2 of the center cross member 26, the torsional moment is not generated in the center cross member 26 caused by the load transmitted from the rear suspension 12. Accordingly, it is possible to reduce the load applied to the center cross member 26, and it is possible to intend to save weight of the cross member. Further, since the swing support point P does not protrude to the front, the rear, the upper and lower with respect to the center cross member 26, the appearance as seen from the side becomes good.

(3) As shown in FIG. 5, since the front member (the displacement portion) 44 of the right rear assist frame member 24R is arranged close to the center O1 of the vehicle width, and the arrangement space S for the rear suspension 12 is formed in the lateral outer side of the displacement portion 44, it is possible to arrange the rear suspension so as to overlap the lower side of the right rear frame member 23R without largely protruding in the vehicle width direction. Accordingly, it is possible to simply perform maintenance, repairs and the like of the rear suspension 12 from the external side of the vehicle body frame 10, the appearance of the motorcycle becomes good, and the rear suspension 12 does not form an obstacle to the legs of the rider and the fellow passenger.

(4) As shown in FIGS. 1 and 5, since the displacement portion 44 of the right rear assist frame member 24R and the right rear frame member 23R are coupled by the connection frame member 46, and both the elements are reinforced by each other, it is possible to maintain the rigidity of the rear frame body 9 in spite of the displacement portion 44 being arranged close to the center O1 of the vehicle width, and it is particularly possible to maintain the lateral torsional rigidity of the rear frame member 23.

Describing this point in detail, the rear assist frame members 24L and 24R mainly form a reinforcement against the load applied to the rear frame members 23L and 23R from above. However, in the present embodiment, as shown in FIG. 1, since a pinching angle β2 between the right rear frame member 23R and the right rear assist frame member 24R becomes smaller than a pinching angle β1 between the left rear frame member 23L and the left rear assist frame member 24L, and the displacement portion 44 is arranged so as to be displaced in the lateral direction with respect to the right rear frame member 23R, the reinforcing function of the single right rear assist frame member 24R is inferior to the left side. Accordingly, in the present embodiment, the reinforcing function is assisted by coupling the displacement portion 44 and the right rear frame member 23R by the connection frame member 46.

(5) As shown in FIG. 5, since the right rear assist frame member 24R is constituted by a combination of the linear front member 44 and the L-shaped rear member 45, it is easy to manufacture the right rear assist frame member 24R and it is possible to fabricate at low cost. Further, it is possible to simultaneously form the cross member (45b) coupling the left and right rear assist frame members 24L and 24R to each other.

(6) In FIG. 9, in the front support boss 63 supporting the front end portion of the rear suspension 12, the thickness of the coupling plate 66 is formed larger than the thickness of the tube body 26A of the center cross member 26. Accordingly, it is possible to partially increase the strength of the portion to which the right main frame member 20R is connected, and it is possible to suppress the weight increase of the entire center cross member 26.

(7) Since the front support boss 63 is formed in the cylindrical shape in the same manner as the tube body 26A of the center cross member 26, the appearance is improved.

(8) The right stabilizer member 52R to which the rear suspension 12 is attached is formed in the oval cross sectional shape and the left stabilizer member 52L is formed in the complete round cross sectional shape such that the strength and the rigidity of the light stabilizer member 52R become higher those of the left stabilizer member 52L. In other words, since the left and right stabilizer members 52L and 52R are structured asymmetrical with each other by the different shaped members, the structure which can resist the reaction force applied from the rear suspension can be obtained by increasing the rigidity of only one (the right stabilizer member), and it is possible to arrange the rear suspension so as to be displaced laterally while suppressing the weight increase of the entire swing arm 11 as much as possible.

(9) Since the right stabilizer member 52R is formed in the vertically long oval shape, and increases the rigidity without enlarging the lateral width, the arrangement space of the peripheral parts (the brake relevant parts and the like) arranged in the side of the swing arm 11 is hardly deprived.

Other Embodiment (1) The vehicle body frame 10 and the swing arm 11 may be structured so as to be laterally inverse with respect to the center O1 of the vehicle width. In this case, the rear suspension 12 may be arranged so as to be displaced to the left side.

Figure 11:
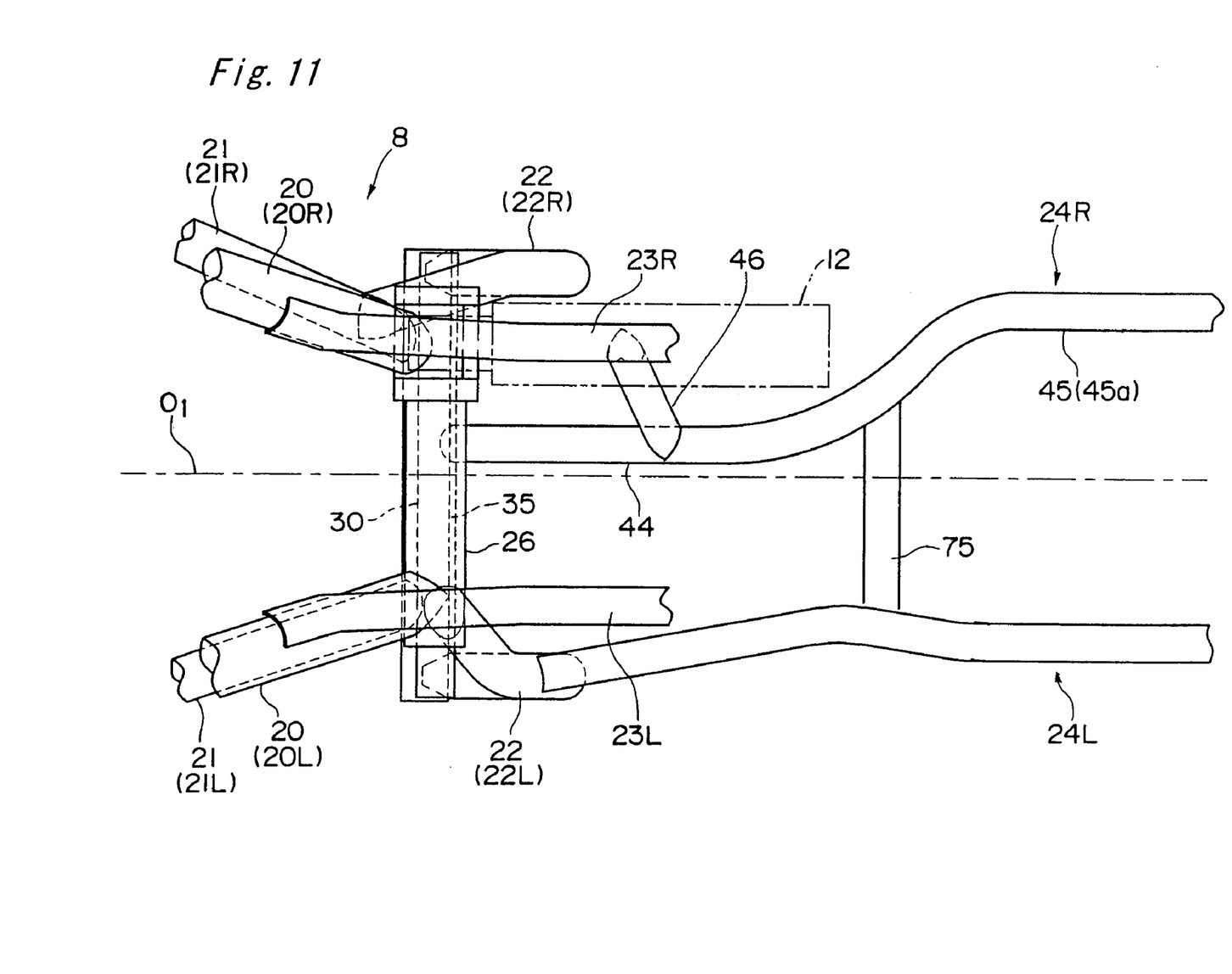
FIG. 11 is a plan view of a center portion in the longitudinal direction of the vehicle body frame in accordance with another embodiment.

(2) The rear assist frame members 24L and 24R may be structured in an aspect shown in FIG. 11. In other words, the longitudinal portion 45a of the rear member 45 of the right rear assist frame member 24R and the front member 44 may be structured by one pipe member, and the intermediate portion between the front member 44 and the rear member 45 may be coupled to the left rear assist frame member 24L by a cross member 75.

(3) The front support boss 63 supporting the front end portion of the rear suspension 12 may be formed by bending the plate material in the U shape, and may be structured so as to be connected to the end portion of the tube body 26A of the center cross member 26. In this case, it is possible to arrange the swing support point P of the rear suspension 12 on the axis O2 of the center cross member 26.

Figure 12:
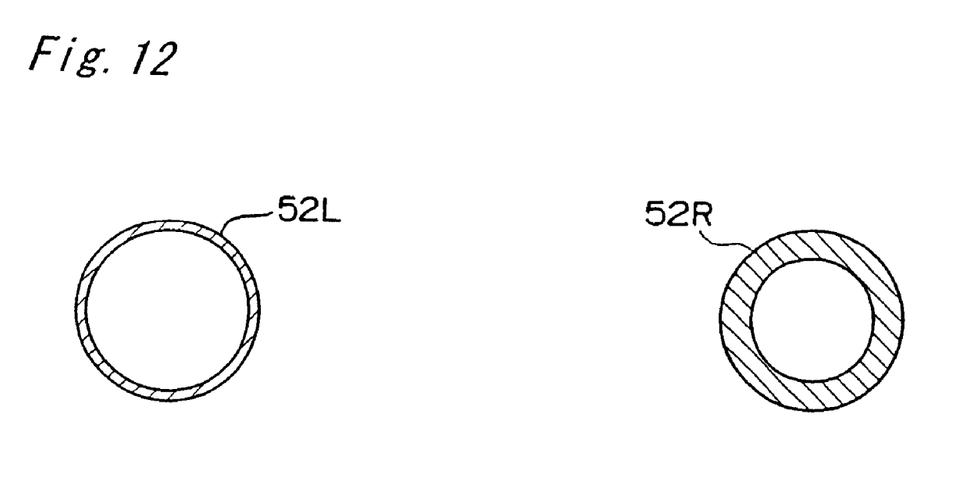
FIG. 12 is a cross sectional view showing shapes of right and left stabilizer members in accordance with the other embodiment.

(4) As a method of forming the left and right stabilizer members 52L and 52R in the asymmetrical cross sectional shape so as to increase the strength of the right stabilizer member 52R with respect to the left stabilizer member 52L, there may be employed a method of forming both the stabilizer members 52L and 52R in the circular cross sectional shape and making the outer diameter of the right stabilizer member 52R larger than the left stabilizer member 52L or setting the outer diameters of both the stabilizer members the same and making the thickness of the right stabilizer member 52R larger than the thickness of the left stabilizer member 52L as shown in FIG. 12.

Although the invention has been described in its preferred embodiments with a certain degree of particularity, obviously many changes and variations are possible therein. It is therefore to be understood that the present invention may be practical otherwise than as specifically described herein without departing from the scope and spirit thereof.

What is claimed is:

1. A vehicle body structure of a motorcycle comprising:
a vehicle body frame;
a swing arm for a rear wheel supported to the vehicle body frame so as to freely swing in a vertical direction; and
a rear suspension interposed between the vehicle body frame and the swing arm for the rear wheel;
wherein the vehicle body frame is provided with a front frame body constituting a front side of the vehicle body frame, and having a head pipe, and a pair of right and left main frame members extending to a rear side from the head pipe, and a rear frame body constituting a rear side of the vehicle body frame, and having a pair of right and left rear frame members extending to a rear side from rear end portions of the main frame members, the rear suspension is arranged so as to be eccentric to any one of right and left directions of the vehicle body from a center of the vehicle width, and extends to a rear side from a portion near a rear end of the main frame member so as to be coupled to the swing arm, and the rear frame body has a layout space for the rear suspension in a lower side of any one of the right and left rear frame members;
wherein the rear frame body has a pair of right and left rear assist frame members arranged in the lower side of the rear frame member, extending to the front side from a rear portion of the rear frame member, and having a front end portion coupled to the front frame body, one of the right and left rear assist frame members has a displacement portion arranged closer to the center of the vehicle width than the other of the right and left rear assist frame members, and the layout space for the rear suspension is formed in an outer side in a lateral direction of the displacement portion.

2. The vehicle body structure of the motorcycle as claimed in claim 1, wherein the displacement portion of one of the right and left rear assist frame members, and the rear frame member in the same side are coupled to each other by a connection frame member extending in a vertical direction.

3. The vehicle body structure of the motorcycle as claimed in claim 1, wherein the rear suspension is arranged at a position overlapping one of the right and left rear frame members as seen from above.

4. The vehicle body structure of the motorcycle as claimed in claim 1, wherein the rear suspension is arranged approximately on the same straight line as one of the right and left main frame member from the rear end portion of the main frame member to a rear side.

5. A vehicle body structure of a motorcycle comprising:
a vehicle body frame;
a swing arm for a rear wheel supported to the vehicle body frame so as to freely swing in a vertical direction; and
a rear suspension interposed between the vehicle body frame and the swing arm for the rear wheel;
wherein the vehicle body frame is provided with a front frame body constituting a front side of the vehicle body frame, and having a head pipe, and a pair of right and left main frame members extending to a rear side from the head pipe, and a rear frame body constituting a rear side of the vehicle body frame, and having a pair of right and left rear frame members extending to a rear side from rear end portions of the main frame members, the rear suspension is arranged so as to be eccentric to any one of right and left directions of the vehicle body from a center of the vehicle width, and extends to a rear side from a portion near a rear end of the main frame member so as to be coupled to the swing arms and the rear frame body has a layout space for the rear suspension in a lower side of any one of the right and left rear frame members; and
wherein the vehicle body frame has a cross member for coupling between rear end portions of the right and left main frame members, the cross member has a front support boss for supporting an end portion of the rear suspension so as to freely swing in a coupled portion to the main frame member, and a swing supporting point of the rear suspension in the front support boss is arranged approximately on the same axis as the cross member.

6. The vehicle body structure of the motorcycle as claimed in claim 5, wherein the rear suspension is arranged approximately on the same straight line as the main frame member as seen from the side.

7. The vehicle body structure of the motorcycle as claimed in claim 5, wherein the cross member has a main body portion extending in a lateral direction, and the front support boss firmly attached to an end portion of the main body portion, and the front support boss has a pair of shaft supporting portions for supporting both end portions of a swing supporting shaft of the rear suspension, and a coupling portion for coupling the shaft supporting portions to each other and connecting rear end portions of the main frame member.

8. A vehicle body structure of a motorcycle comprising:
a vehicle body frame;
a swing arm for a rear wheel supported to the vehicle body frame so as to freely swing in a vertical direction; and
a rear suspension interposed between the vehicle body frame and the swing arm for the rear wheel;
wherein the vehicle body frame is provided with a front frame body constituting a front side of the vehicle body frame, and having a head pipe, and a pair of right and left main frame members extending to a rear side from the head pipe, and a rear frame body constituting a rear side of the vehicle body frame, and having a pair of right and left rear frame members extending to a rear side from rear end portions of the main frame members, the rear suspension is arranged so as to be eccentric to any one of right and left directions of the vehicle body from a center of the vehicle width, and extends to a rear side from a portion near a rear end of the main frame member so as to be coupled to the swing arm, and the rear frame body has a layout space for the rear suspension in a lower side of any one of the right and left rear frame members;
wherein the swing arm has a pair of right and left arm members, a pair of right and left stabilizer members respectively provided on upper surfaces of the arm members, and a rear support boss for supporting an end portion of the rear suspension, the rear support boss being integrally connected to one of the right and left stabilizer members, both the stabilizer members are formed in different cross sectional shapes from each other in such a manner that rigidity of one of the right and left stabilizer members connected to the rear support boss becomes higher than rigidity of the other of the right and left stabilizer members; and
wherein one of the right and left stabilizer members connected to the rear support boss is arranged approximately on the same straight line as the rear suspension as seen from the side in such a manner as to extend to the rear side.

9. A vehicle body structure of a motorcycle comprising:
a vehicle body frame;
a swing arm for a rear wheel supported to the vehicle body frame so as to freely swing in a vertical direction; and
a rear suspension interposed between the vehicle body frame and the swing arm for the rear wheel;
wherein the vehicle body frame is provided with a front frame body constituting a front side of the vehicle body frame, and having a head pipe, and a pair of right and left main frame members extending to a rear side from the head pipe, and a rear frame body constituting a rear side of the vehicle body frame, and having a pair of right and left rear frame members extending to a rear side from rear end portions of the main frame members, the rear suspension is arranged so as to be eccentric to any one of right and left directions of the vehicle body from a center of the vehicle width, and extends to a rear side from a portion near a rear end of the main frame member so as to be coupled to the swing arm, and the rear frame body has a layout space for the rear suspension in a lower side of any one of the right and left rear frame members;
wherein the swing arm has a pair of right and left arm members, a pair of right and left stabilizer members respectively provided on upper surfaces of the arm members, and a rear support boss for supporting an end portion of the rear suspension, the rear support boss being integrally connected to one of the right and left stabilizer members, both the stabilizer members are formed in different cross sectional shapes from each other in such a manner that rigidity of one of the right and left stabilizer members connected to the rear support boss becomes higher than rigidity of the other of the right and left stabilizer members; and
wherein a length in a vertical direction of the cross sectional shape of one of the right and left stabilizer members connected to the rear support boss is formed longer than a length in the vertical direction of the cross sectional shape of the other of the right and left stabilizer members.

* * * * *